(12) United States Patent
Fujii et al.

(10) Patent No.: US 8,038,047 B2
(45) Date of Patent: *Oct. 18, 2011

(54) METHOD FOR WELDING METAL MATERIAL

(75) Inventors: Hidetoshi Fujii, Suita (JP); Tomohiro Maruko, Tokyo (JP)

(73) Assignees: Osaka University, Osaka (JP); Furuya Metal Co., Ltd., Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 12/438,655

(22) PCT Filed: Aug. 23, 2007

(86) PCT No.: PCT/JP2007/066359
§ 371 (c)(1),
(2), (4) Date: Apr. 21, 2009

(87) PCT Pub. No.: WO2008/023760
PCT Pub. Date: Feb. 28, 2008

(65) Prior Publication Data
US 2010/0252614 A1 Oct. 7, 2010

(30) Foreign Application Priority Data
Aug. 25, 2006 (JP) .............................. P2006-229527

(51) Int. Cl.
*B23K 20/12* (2006.01)
(52) U.S. Cl. ...................................... 228/112.1; 228/2.1
(58) Field of Classification Search ............... 228/112.1, 228/2.1
See application file for complete search history.

(56) References Cited

U.S. PATENT DOCUMENTS

| | | | |
|---|---|---|---|
| 2,698,892 A | 1/1955 | Hardin | |
| 2,804,885 A | 9/1957 | Mott | |
| 4,291,104 A | 9/1981 | Keifert | |
| 5,998,913 A * | 12/1999 | Matsutani | ............ 313/141 |
| 7,481,971 B2 * | 1/2009 | Coupland et al. | ............ 420/461 |

(Continued)

FOREIGN PATENT DOCUMENTS

EP 1690627 8/2006

(Continued)

OTHER PUBLICATIONS

International Search Report w/translation from PCT/JP2007/066359 dated Nov. 27, 2007 (2 pages).

(Continued)

*Primary Examiner* — Roy King
*Assistant Examiner* — Michael Aboagye
(74) *Attorney, Agent, or Firm* — Osha Liang LLP

(57) ABSTRACT

Metallic materials having a melting point of at least 2000° C. are caused to abut against each other in a welding part. The rear face side of the welding part is covered by a backing member having a thermal conductivity of 30 W/mK or lower, and then a columnar probe of a rotary tool comprising an Ir alloy is inserted into the front face side of the welding part to weld the metallic materials together. On the front face side of the welding part, inactive gas is supplied into a shield cover. The rotary tool is moved along a longitudinal direction of the welding part while rotating the rotary tool, whereby the metallic materials are welded together. By using the rotary tool comprising an Ir alloy, the refractory metals can be welded to each other by means of friction stir welding.

4 Claims, 10 Drawing Sheets

U.S. PATENT DOCUMENTS

| | | | |
|---|---|---|---|
| 7,521,850 B2 * | 4/2009 | Lykowski | 313/144 |
| 7,530,486 B2 * | 5/2009 | Flak et al. | 228/112.1 |
| 7,743,961 B2 * | 6/2010 | Maruko et al. | 228/112.1 |
| 2005/0129960 A1 * | 6/2005 | Liu et al. | 428/427 |
| 2006/0175382 A1 * | 8/2006 | Packer et al. | 228/112.1 |

FOREIGN PATENT DOCUMENTS

| | | |
|---|---|---|
| JP | 2-54768 A | 2/1990 |
| JP | 2792233 | 6/1998 |
| JP | 2001-121274 A | 5/2001 |
| JP | 2002-248583 A | 9/2002 |
| JP | 2002-273579 A | 9/2002 |
| JP | 2002-346770 A | 12/2002 |
| JP | 2003-088964 A | 3/2003 |
| JP | 2003-532542 T | 11/2003 |
| JP | 2004-090050 * | 3/2004 |
| JP | 2004-090050 A | 3/2004 |
| JP | 2004-195480 A | 7/2004 |
| JP | 2004-344906 A | 12/2004 |
| JP | 2004-358556 A | 12/2004 |
| JP | 2004337860 | 12/2004 |
| WO | 2005/105361 A1 | 11/2005 |

OTHER PUBLICATIONS

English abstract for JP9508073 which corresponds to JP2792233, from esp@cenet, Publication Date: Aug. 19, 1997, 1 page.

English Abstract for JP2004-090050, from esp@cenet, Publication Date: Mar. 25, 2004, 1 page.

English Abstract for JP2004195480, from esp@cenet, Publication Date: Jul. 15, 2004, 1 page.

English Abstract for JP2002273579, from esp@cenet, Publication Date: Sep. 25, 2002, 1 page.

English Abstract for JP2002346770, from esp@cenet, Publication Date: Dec. 4, 2002, 1 page.

English Abstract for JP2003088964, from esp@cenet, Publication Date: Mar. 25, 2003, 1 page.

English Abstract for JP2004344906, from esp@cenet, Publication Date: Dec. 9, 2004, 1 page.

Translation of the International Preliminary Report on Patentability and the Written Opinion of the International Searching Authority, for International Patent Application No. PCT/JP2007/066359, dated Mar. 12, 2009, 5 pages.

Extended European Search Report in Patent Application No. 07805988.8, dated Oct. 20, 2010, (7 pages).

Patent Abstracts of Japan for Publication No. 2004337860, Publication date Dec. 2, 2004, (1 page).

Submission of Documents, Etc. for Application No. P2008-530951 dated Jan. 11, 2011, with English translation thereof (8 pages).

Kikaikosakuho 3 Yosetsukako co-authored by Michio Inagaki, et al "1.3 Kakushu zairyo no Yosetsusei" P.P.38; Kabushikikaisha Seibundo Shinkosha First Edition Published on Jul. 25, 1971 (8 pages).

Third Revision Kagaku Kogaku Benran Edited by Society for Chemical Engineers "23. Sochizairyo"; P.P. 1317-1325 Maruzen Company, Published on May 10, 1968 (8 pages).

* cited by examiner

METHOD FOR WELDING METAL MATERIAL

TECHNICAL FIELD

The present invention relates to a method for welding a metallic material, and particularly to a method for welding a metallic material in which friction stir welding is performed on a refractory metal having a melting point of at least 2000° C.

BACKGROUND ART

When melt-welding a refractory metal having a melting point of at least 2500° C., such as tungsten (W), molybdenum (Mo), tantalum (Ta), rhenium (Re), and alloy consisting primarily of these metals, or a refractory metal having a melting point of at least 2000° C., such as iridium (Ir) and alloy consisting primarily of this metal, the welding part forms a solidification structure and becomes polycrystalline with coarse grains. The refractory metallic materials described above have brittle crystal grain boundaries, which is a cause of a fatal defect in the welding part. Therefore, welding the above refractory metallic materials is conventionally performed mainly by means of rivet welding.

On the other hand, a technology for welding a metallic material by means of friction stir welding (FSW) has been known as a method for welding a metallic material. When performing the friction stir welding, metallic materials to be boned are placed to face a welding part. Then, a probe provided at a leading end of a rotary tool is inserted into the welding part, and the rotary tool is rotated and moved along a longitudinal direction of the welding part and the metallic materials are subjected to plastic flow by frictional heat to weld the two metallic materials to each other (see Patent Literature 1, for example).

Patent Literature 1: Japanese Patent Application No. 2792233

Although friction stir welding can basically achieve good welding strength, friction stir welding is generally employed for low-melting metals such as aluminum (Al) and magnesium (Mg). Hence, application of friction stir welding is limited to ferrous materials in the research steps, and friction stir welding is not performed on the above refractory metals.

SUMMARY OF INVENTION

In one aspect, the present invention is directed to a method for welding a metallic material, in which two metallic materials having a melting point of at least 2000° C. are caused to face each other in a welding part, a rod-like rotary tool having Ir is inserted into the welding part, and the rotary part is rotated while an inert atmosphere is produced in the welding part on at least a side, into which the rotary tool is inserted, in order to weld the two metallic materials together.

According to this configuration, friction stir welding is performed under an inert atmosphere by using the rod-like rotary tool having iridium (Ir). Therefore, even when welding refractory metallic materials having a melting point of at least 2000° C., the refractory metals can be welded to each other by the friction stir welding, because of the sufficient durability of the rotary tool. Moreover, embrittlement of the grain boundaries of the welding part that is caused by contact between oxygen and nitrogen in the air can be prevented by bringing the side of the welding part, into which the rotary tool is inserted, into the inert atmosphere. In this manner, good welding can be performed.

The method for welding a metallic material according to one or more embodiments of the present invention has the following four aspects and a combination thereof: (1) friction stir welding in which the welding part is formed by abutting edges of plate-like metallic materials against each other, and the rotary tool is rotated and moved along a longitudinal direction of the welding part under an inert atmosphere to weld the metallic materials together; (2) spot friction stir welding (Spot FSW) in which the welding part is formed by abutting edges of plate-like metallic materials against each other, and the rotary tool is rotated without being moved in the welding part under the inert atmosphere, to weld the metallic materials together; (3) spot friction stir welding in which metallic materials are superimposed on each other in the welding part, the rotary tool is inserted into the welding part, and the rotary tool is rotated without being moved in this section under the inert atmosphere, to weld the metallic materials together; and (4) friction stir welding in which metallic materials are superimposed on each other in the welding part, the rotary tool is inserted into the welding part, and the rotary tool is rotated and moved along a longitudinal direction of the welding part under the inert atmosphere to weld the metallic materials together.

In this case, it is preferred that the rotary tool further include any of Re, Mo, W, Ta, Zr, and Hf.

According to this configuration, the durability of the rotary tool is further improved by further including the rotary tool with any one of Re, Mo, W, Ta, Zr, and Hf.

Moreover, in this case, it is preferred that the rotary tool comprise either a substance having 0.9 to 35.3 mass % of Re or a substance having 0.9 to 36.3 mass % of Re and 0.05 to 3 mass % of Zr.

According to this configuration, the rotary tool consists of either a substance having 0.9 to 35.3 mass % of rhenium (Re) or a substance having 0.9 to 36.3 mass % of Re and 0.05 to 3 mass % of zirconium (Zr), so that the durability of the rotary tool is further improved.

In this case, it is preferred that the metallic materials be welded while covering with a backing member having a thermal conductivity of 30 W/mK or lower an opposite side of the welding part to the side into which the rotary tool is inserted.

According to this configuration, the metallic materials are welded while covering a side opposite to the side of the welding part into which the rotary tool is inserted, with a backing member having a thermal conductivity of 30 W/mK or lower. Therefore, a reduction of the temperature of the welding part is minimized, and the welding strength and welding efficiency can be improved.

In this case, it is preferred that a leading end of the rotary tool have a columnar probe that is inserted into the welding part.

According to this configuration, because a leading end of the rotary tool is provided with a columnar probe that is inserted into the welding part, less abrasion is detected compared to when a probe having a screw-like groove is used, and the life of the rotary tool can be improved.

In this case, it is preferred that the metallic materials be welded while rotating the rotary tool at 1000 rpm or lower.

According to this configuration, sufficient stirring efficiency can be achieved by rotating the rotary tool at 1000 rpm or lower. Even when using the rotary tool that has the columnar probe without a screw-like groove, sufficient stirring efficiency can be obtained.

According to one or more embodiments of the method for welding a metallic material, refractory metals having a melting point of at least 2000° C. can be welded by means of friction stir welding.

Figure 5:
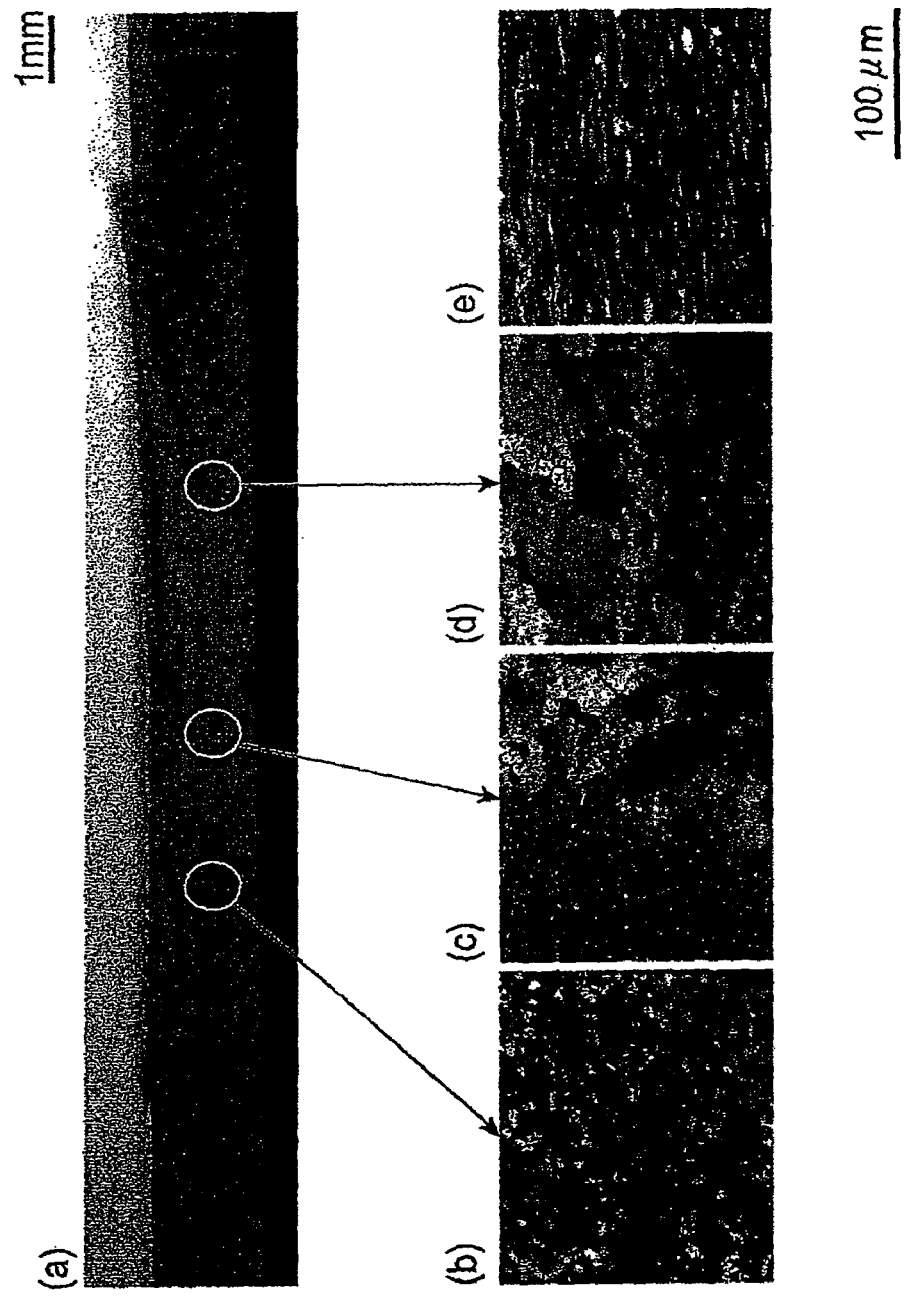
Figure 6:
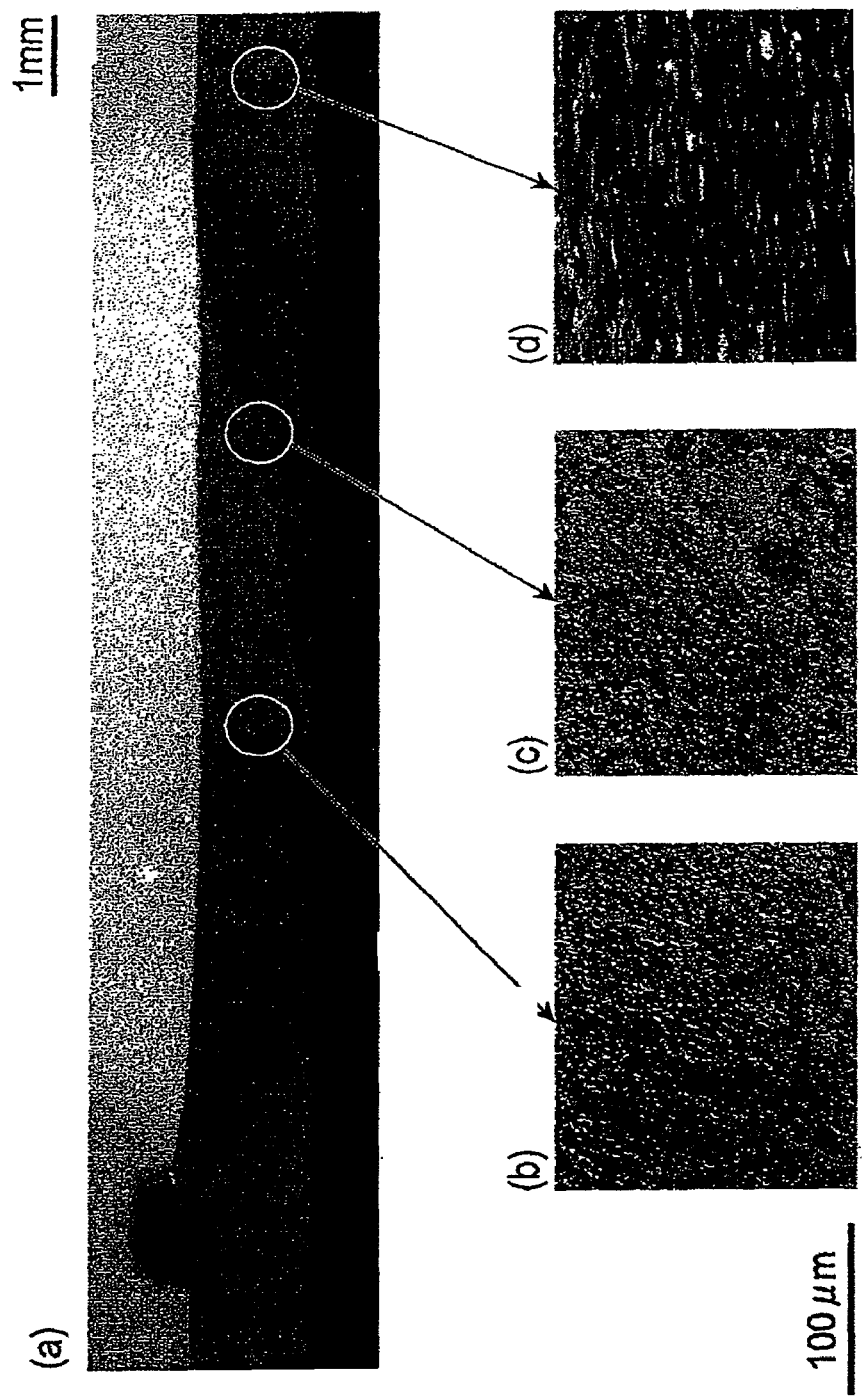
Figure 7:
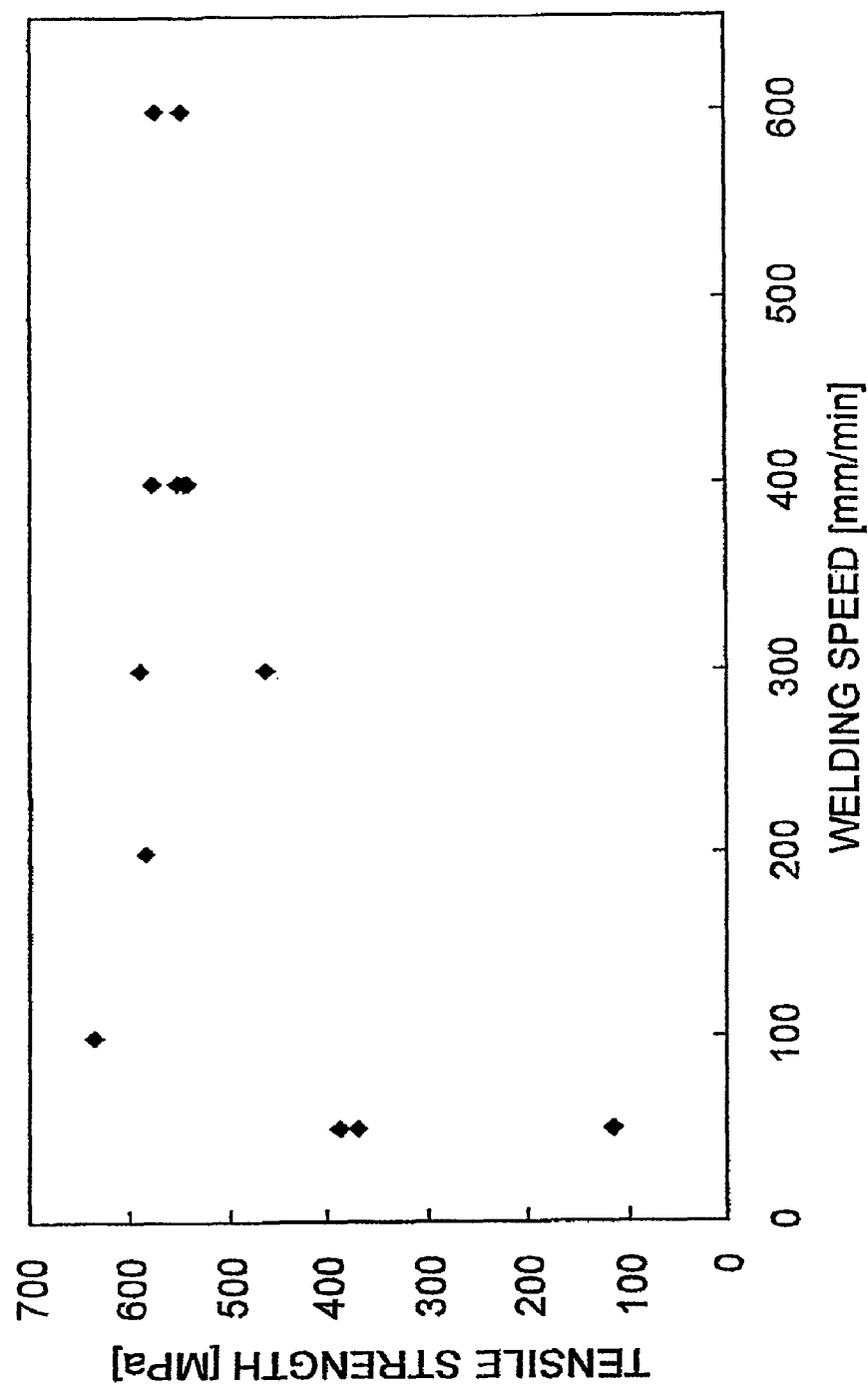
Figure 8:
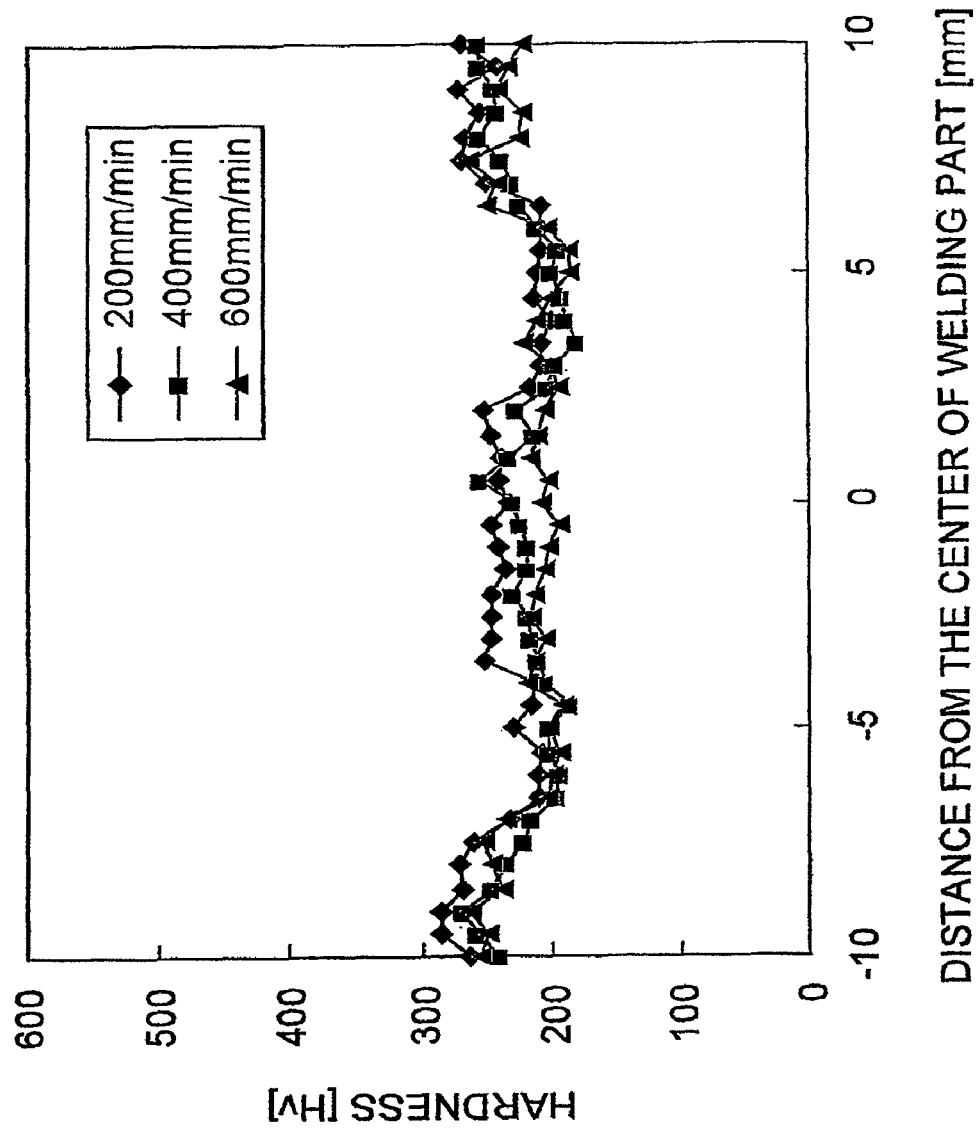
Figure 9:
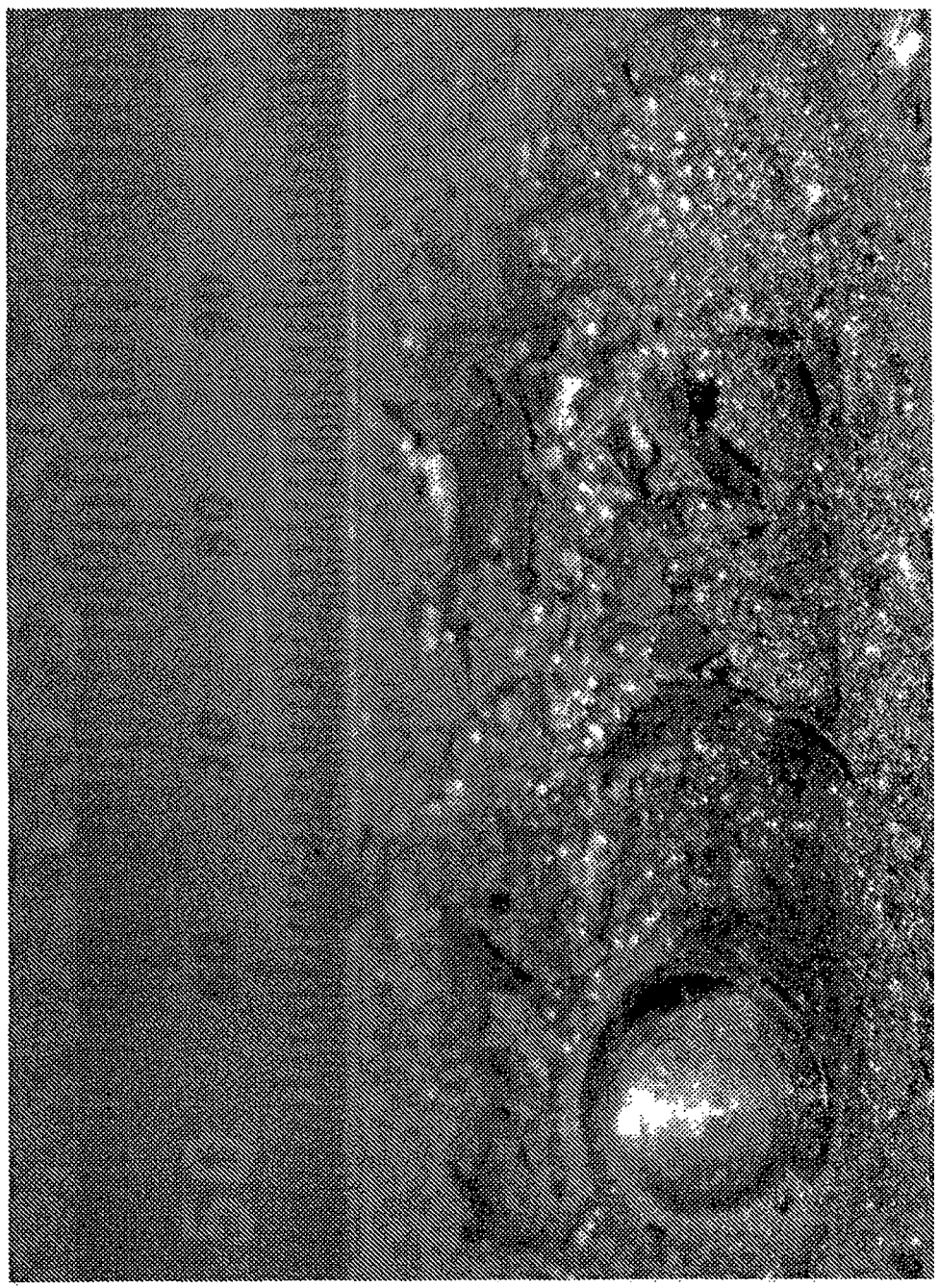
Figure 10:
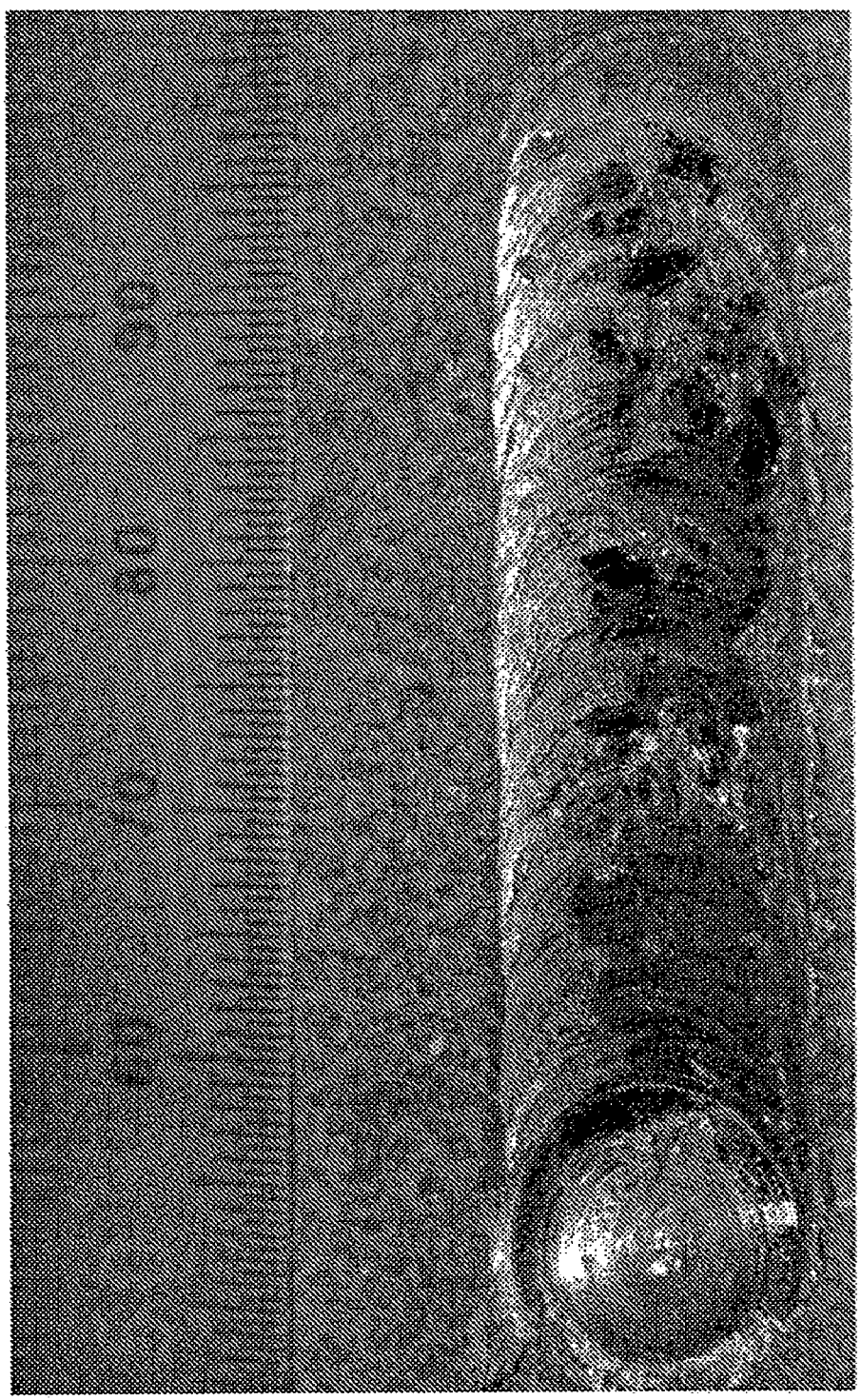

(a) to (e) of FIG. 5 are diagrams each showing a metallic structure of a Mo material used in Experimental Example 1;

(a) to (d) of FIG. 6 are diagrams each showing a metallic structure of the Mo material used in Experimental Example 1;

FIG. 7 is a graph showing a result of a tensile test performed in Experimental Example 1;

FIG. 8 is a graph showing a result of a hardness test performed in Experimental Example 1;

FIG. 9 is a diagram showing a metallic structure of a welding part of the Mo material that is welded in an atmosphere in Experimental Example 1; and FIG. 10 is a diagram showing a metallic structure of the welding part of the Mo material that is welded in the atmosphere in Experimental Example 1.

EXPLANATIONS OF REFERENCE NUMERALS

| | |
|---|---|
| 1, 2 | Mo material |
| 3 | Welding part |
| 4 | Backing member |
| 5 | Rotary tool |
| 6 | Probe |
| 8 | Shield cover |
| 9 | Shield case |

DETAILED DESCRIPTION

Embodiments of the present invention are now described hereinafter with reference to the accompanying drawings.

Figure 1:
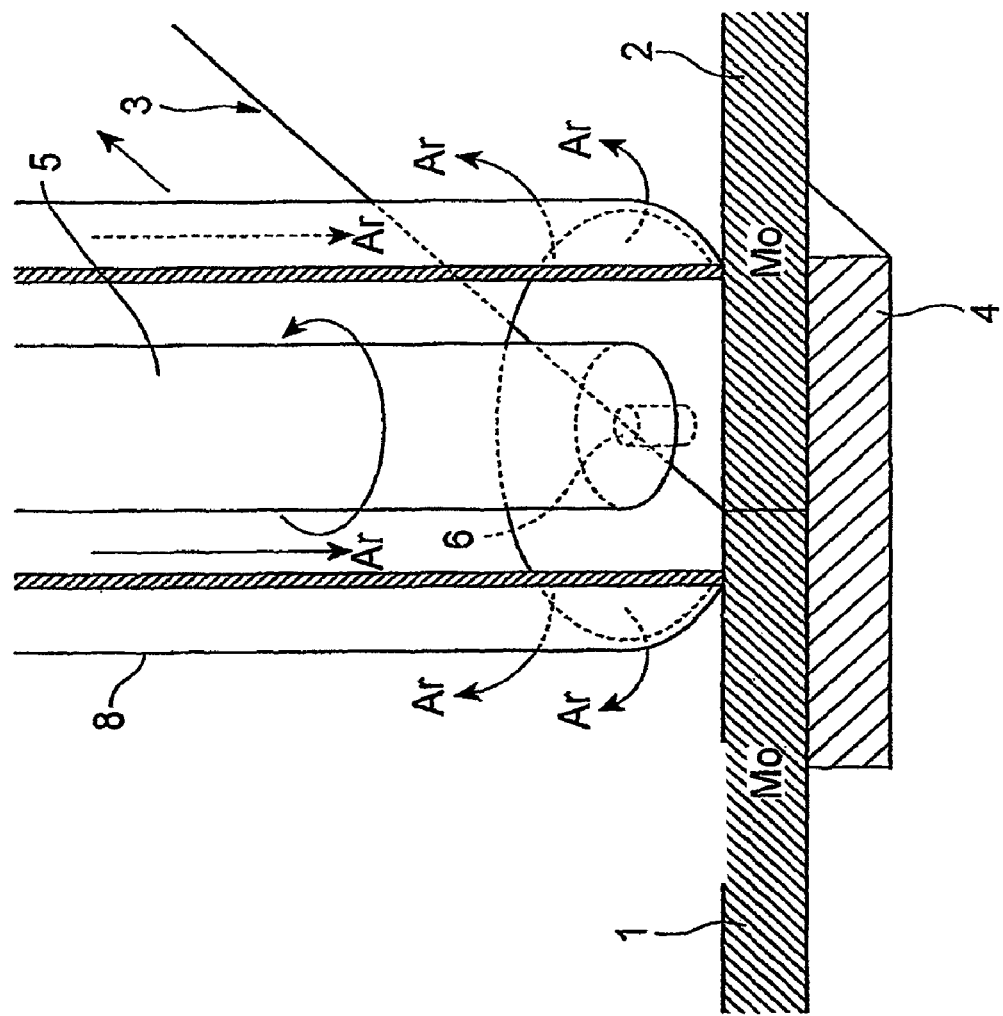
FIG. 1 is a perspective view showing a first embodiment of a method for welding a metallic material according to the present invention.

FIG. 1 is a perspective view showing a first embodiment of a method for welding a metallic material according to the present invention. In this embodiment, as shown in FIG. 1, edges of plate-like metallic materials 1, 2 are caused to abut against each other in a welding part 3, the rear face side of the welding part 3 is covered by a plate-like backing member 4, and then a probe 6 of a rotary tool 5 is inserted into the front face side of the welding part 3 to weld the metallic materials 1, 2 together. A shield cover 8 is disposed on the front face side of the welding part 3 to surround the rotary tool 5. Inactive gas is introduced into the shield cover 8 to weld the metallic materials 1, 2 to each other under an inert atmosphere.

In the present embodiment, a refractory metal having a melting point of at least 2500° C., such as tungsten (W), molybdenum (Mo), tantalum (Ta), rhenium (Re), and alloy consisting primarily of these metals, or a refractory metal having a melting point of at least 2000° C., such as iridium (Ir) and alloy consisting primarily of this metal, can be employed as the metallic materials 1, 2 to be welded. Not only the same types of materials, but also various dissimilar metals can be employed as the metallic materials 1, 2.

As shown in FIG. 1, the rotary tool 5 is substantially in the form of a cylinder and, at a leading end thereof, has a substantially columnar probe 6 having a diameter smaller than that of a main body of the rotary tool 5. A side face of the probe 6 is not provided with a screw-like groove illustrated in FIG. 2 of Patent Literature 1, and thus has a flat side face. The distance between the backing member 4 and a leading end of the probe 6 of the rotary tool 5 inserted into the welding part 3 is preferably set as short as possible so as not to create a non-welding part.

The material of the rotary tool 5 is preferably an Ir alloy, or specifically an Ir alloy consisting of a substance having 0.9 to 35.3 mass % of rhenium (Re) or, more preferably, a substance having 3 to 10 mass % of Re and the remaining Ir. Alternatively, the material of the rotary tool 5 is an Ir alloy consisting of a substance having 0.9 to 36.3 mass % of Re and 0.05 to 3 mass % of zirconium (Zr) or, more preferably, a substance having 3 to 10 mass % of Re and 1 to 3 mass % of Zr and the remaining Ir. Alternatively, the material of the rotary tool 5 can be any one of Ir alloys selected from an Ir alloy consisting of a substance having 0.5 to 13.0 mass % of molybdenum (Mo) and the remaining Ir, Ir alloy consisting of a substance having 0.9 to 18.3 mass % of tungsten (W) and the remaining Ir, Ir alloy consisting of a substance having 0.9 to 15.2 mass % of tantalum (Ta) and the remaining Ir, Ir alloy consisting of a substance having 0.1 to 2.4 mass % of zirconium (Zr) and the remaining Ir, Ir alloy consisting of a substance having 0.2 to 11.2 mass % of hafnium (Hf) and the remaining Ir, and Ir alloy consisting of a substance having 0.9 to 35.4 mass % of rhenium (Re), 0.1 to 4.7 mass % of hafnium (Hf) and the remaining Ir.

A product comprising a substance having a thermal conductivity of 30 W/mK or lower can be employed as the backing member 4. It is preferred that the backing member 4 have sufficient compressive strength to be able to sustain a load of 1000 to 3000 kg at the time of high-temperature welding. Examples of the material of the backing member 4 include an alloy that consists primarily of a metal, ceramic, and the like. Moreover, not only the backing member but also an auxiliary heat source or a cooling device that utilizes arc discharge or laser radiation can be appropriately used in order to adjust the temperature of the welding part 3.

The shield cover 8 has a substantially cylindrical shape and is disposed to surround the rotary tool 5. The shield cover 8 is so designed that the rotary tool 5 can be moved along a longitudinal direction the welding part 3 upon welding the metallic materials 1, 2 together and that the shield cover 8 can move in the same direction while surrounding the rotary tool 5. When welding the metallic materials 1, 2 together, inactive gas is supplied into the shield cover 8 as shielding gas. Examples of the inactive gas used as the shielding gas can include argon (Ar), helium (He), neon (Ne), krypton (Kr), xenon (Xe), or other gas consisting of a 0 group element. In addition, when embrittlement of the grain boundaries is not caused by nitriding the metallic materials to be welded, $N_2$ gas or other gas obtained by adding a minute amount of $H_2$ to $N_2$ can be used.

As shown in FIG. 1, in the present embodiment the metallic materials 1, 2 can be welded to each other by inserting the probe 6 of the rotary tool 5 into the welding part 3, supplying the shielding gas into the shield cover 8, and at the same time moving the rotary tool 5 along the longitudinal direction of the welding part 3 while rotating the rotary tool 5.

According to the present embodiment, friction stir welding is performed under an inert atmosphere by using the rotary tool 5 consisting of the Ir alloy. Therefore, even when welding the metallic materials 1, 2 having a melting point of at least 2000° C., the refractory metals can be welded to each other by the friction stir welding, because of the sufficient durability of the rotary tool 5. The side of the welding part 3 into which the rotary tool 5 is inserted is covered by the shield cover 8, and the shield gas such as Ar gas is supplied to the shield cover 8, whereby embrittlement of the grain boundaries of the welding part 3 that is caused by contact between oxygen and nitrogen in the air can be prevented. In this manner, good welding can be performed.

Particularly, in the present embodiment the rotary tool 5 is made of an Ir alloy consisting of a substance having 0.9 to 35.3 mass % of rhenium (Re) or, more preferably, a substance having 3 to 10 mass % of Re and the remaining Ir, or an Ir alloy consisting of a substance having 0.9 to 36.3 mass % of Re and 0.05 to 3 mass % of zirconium (Zr) or, more preferably, a substance having 3 to 10 mass % of Re and 1 to 3 mass % of Zr and the remaining Ir. Therefore, the durability of the rotary tool 5 can be further improved.

Moreover, according to the present embodiment, the metallic materials 1, 2 are welded to each other while covering the side opposite to the side of the welding part 3 into which the rotary tool 5 is inserted, with the backing member 4 that is made of ceramic or consists of an alloy primarily containing a metal having a thermal conductivity of 30 W/mK or lower. Therefore, a reduction of the temperature of the welding part 3 is minimized, and the welding strength and welding efficiency can be improved.

In addition, according to the present embodiment, because the leading end of the rotary tool 5 is provided with the columnar probe 6 that is inserted into the welding part 3 and the probe 6 has a flat side face, less abrasion is detected compared to when a probe having a screw-like groove is used, and the life of the rotary tool 5 can be improved.

According to the present embodiment, sufficient stirring efficiency can be achieved by welding the metallic materials 1, 2 to each other by rotating the rotary tool 5 at 1000 rpm or lower. Hence, even when using the rotary tool 5 that has the columnar probe 6 without a screw-like groove, sufficient stirring efficiency can be obtained.

In addition, according to the present embodiment, the metallic materials 1, 2 having a high melting point can be welded to each other by means of friction stir welding. Therefore, instead of performing spot welding such as rivet welding, linear welding can be performed to weld the refractory metals, whereby the welding strength can be performed. Moreover, because the metallic materials 1, 2 having a high melting point can be welded together by means of friction stir welding, the refractory metallic materials can be welded at higher speed.

Figure 2:
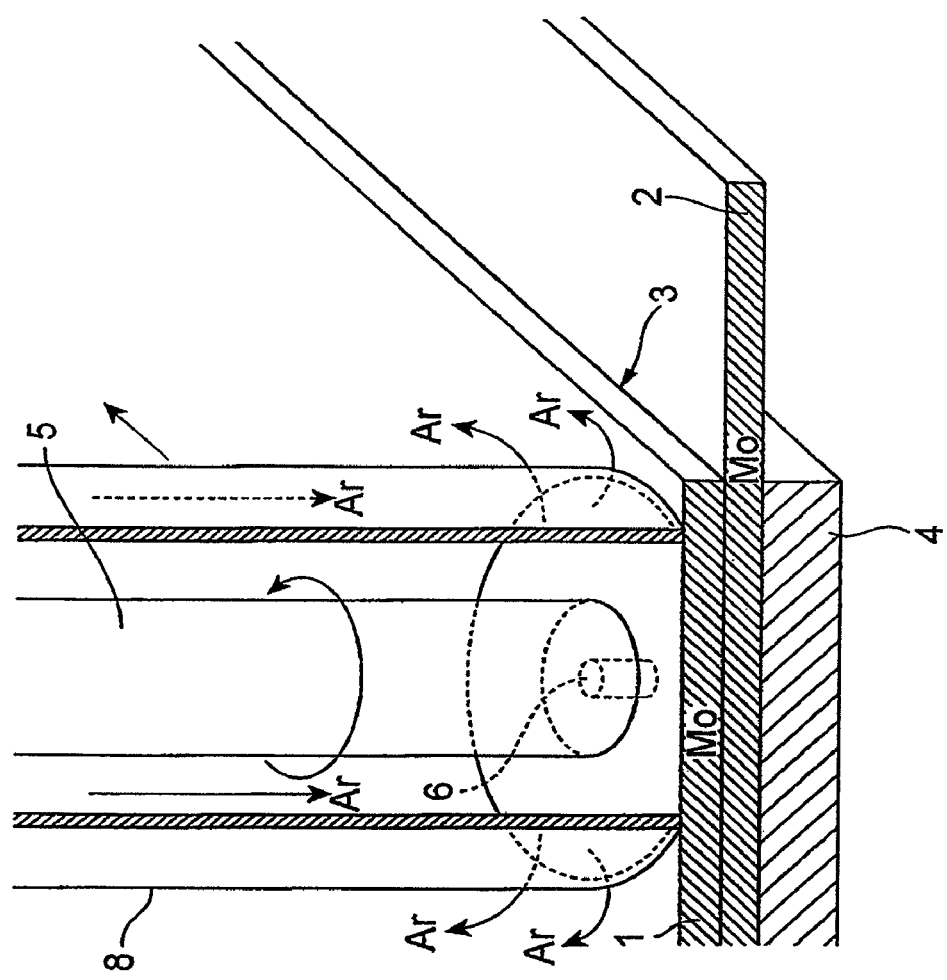
FIG. 2 is a perspective view showing a second embodiment of a method for welding a metallic material according to the present invention.

FIG. 2 is a diagram showing a method for welding a metallic material according to a second embodiment of the present invention. As shown in FIG. 2, in the present embodiment the metallic materials 1, 2 are superimposed on each other in the welding part 3, the rotary tool 5 is inserted into the welding part 3 via one of the metallic materials, the metallic material 1, and the metallic materials 1, 2 are welded together while rotating the rotary tool 5. In a similar manner, friction stir welding can be performed in a wider welding part 3 as well, by successively inserting and rotating a rotary tool 18 in another section.

Figure 3:
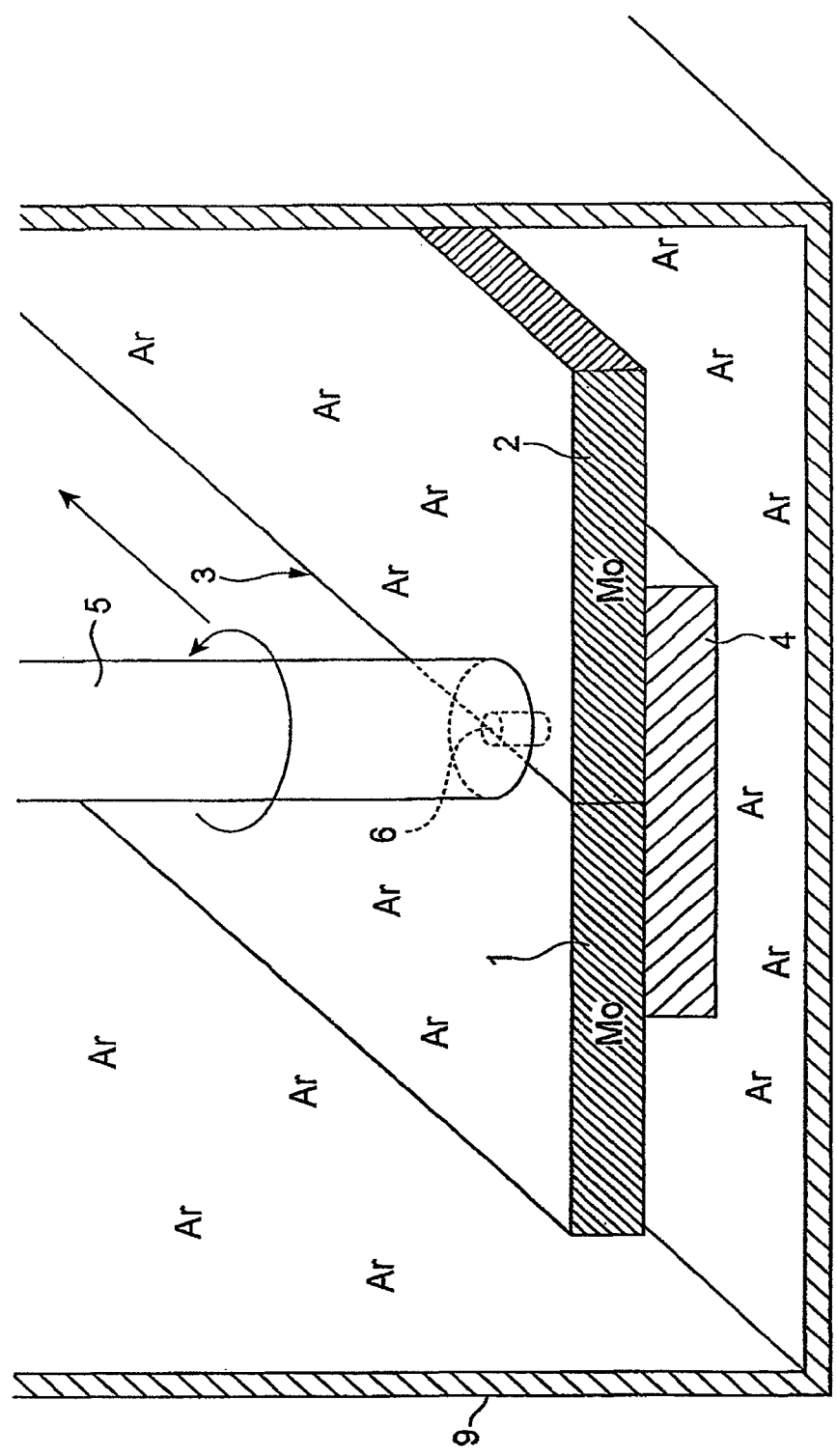
FIG. 3 is a perspective view showing a third embodiment of a method for welding a metallic material according to the present invention.

FIG. 3 is a diagram showing a method for welding a metallic material according to a third embodiment of the present invention. As shown in FIG. 3, the present embodiment not only covers only the periphery of the rotary tool 5 with the shield cover 8 as described in the first embodiment, but also accommodates the entire rotary tool 5, metallic materials 1, 2 and backing member 4 in a shield case 9, and supplies the shield gas such as Ar gas into the shield case 9 to bring the rotary tool 5, the metallic materials 1, 2 and the backing member 4 into the inert atmosphere. In the present embodiment, bringing the entire rotary tool 5, metallic materials 1, 2 and backing member 4 into the inert atmosphere further prevents the embrittlement of the grain boundaries of the welding part 3 that is caused by contact between oxygen and nitrogen in the air.

Figure 4:
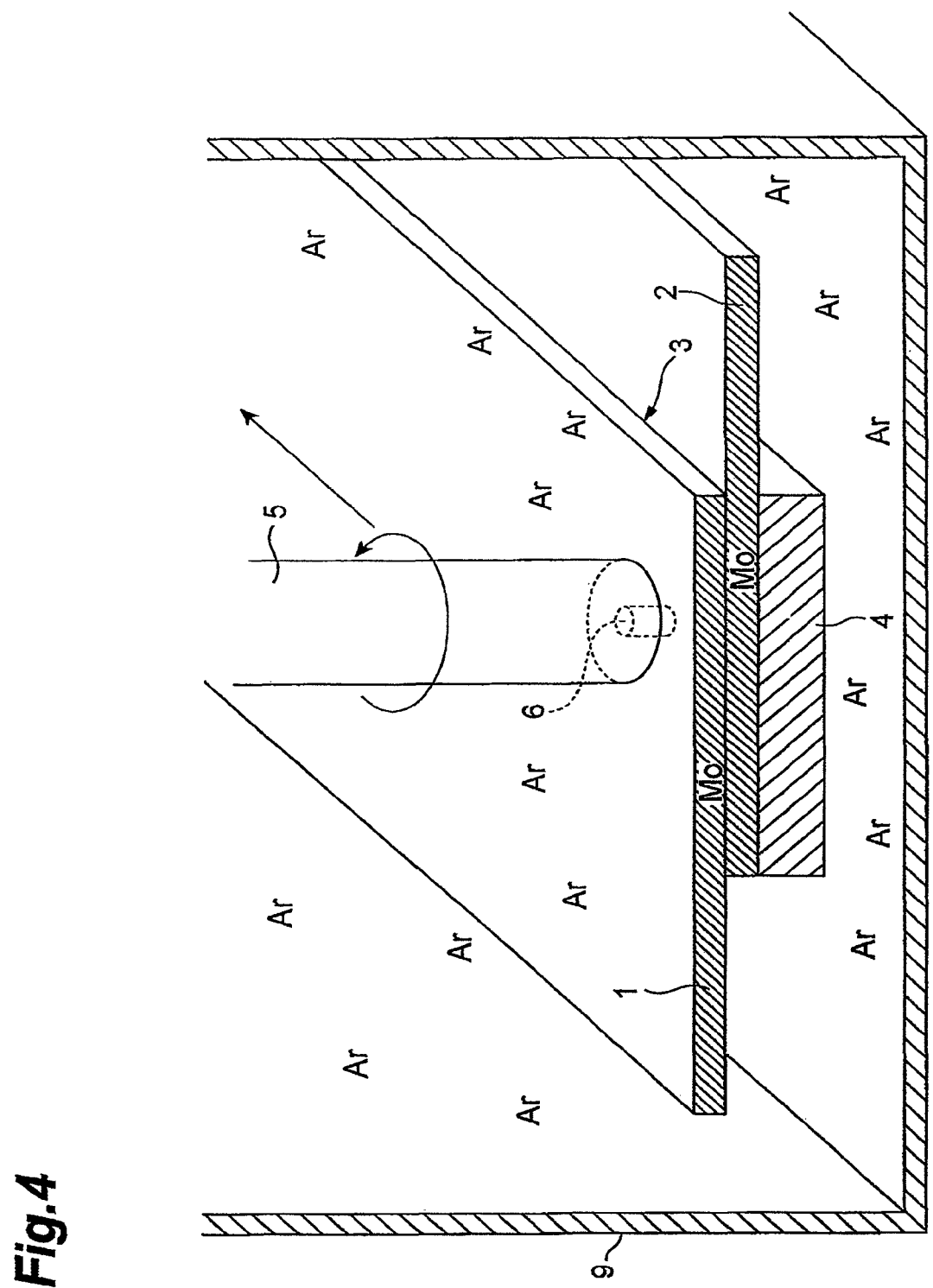
FIG. 4 a perspective view showing a fourth embodiment of a method for welding a metallic material according to the present invention.

FIG. 4 is a diagram showing a method for welding a metallic material according to a fourth embodiment of the present invention. As shown in FIG. 4, even in a case in which the metallic materials 1, 2 are superimposed on each other in the welding part 3 and the rotary tool 5 is inserted into the welding part 3 to weld the metallic materials 1, 2 to each other, the entire rotary tool 5, metallic materials 1, 2 and backing member 4 can be accommodated in the shield case 9, and by supplying shield gas, such as Ar gas into the shield case 9, to bring shield case into the inert atmosphere, the embrittlement of the grain boundaries of the welding part 3 which is caused by contact with oxygen and nitrogen in the air can be prevented.

The method for welding a metallic material according to the present invention is not limited to the one described in the above embodiments and can be changed in various ways within the scope not deviating from the gist of the present invention.

Next are described the experimental results that are obtained by the inventors of the present invention by actually welding the metallic materials together using the method for welding a metallic material according to the present invention.

Experimental Example 1

Two 100 mm in length×50 mm in width×1.5 mm in thickness pure molybdenum flat plates (purity: 99.99%) were used as samples to perform friction stir welding using the method shown in FIG. 1. A product made of an Ir alloy consisting of 3 to 10 mass % of Re, 1 to 3 mass % of Zr and the remaining Ir was used as the rotary tool 5. For the size of the rotary tool 5, shoulder diameter (diameter of the main body) was 15 mm, the length of the probe 6 was 1.4 mm, and the diameter of the probe 6 was 6 mm. The side face of the probe 6 is flat and is not provided with the screw-like groove illustrated in FIG. 2 of Patent Literature 1. A ceramic product having a thermal conductivity of 30 W/mK or lower was used as the backing member 4, and Ar gas was used as the shield gas.

The welding conditions were such that the rotation speed of the rotary tool 5 was set at a constant speed of 1000 rpm, and the welding speed was changed between 50 to 600 mm/min. An experiment was performed using the method shown in FIG. 2 with a welding speed of 400 mm/min and 600 mm/min. After welding was performed, the macro structure and micro structure of the test material were observed. In addition, a tensile test for evaluating the mechanical characteristics and a hardness test to check the hardness of a cross section perpendicular to a welding direction were carried out.

Each of (a) to (e) of FIG. 5 is a diagram showing the metallic structure of a Mo material used in the present experimental example, wherein (a) of FIG. 5 is a diagram showing the macro structure that is obtained by welding the Mo material under the conditions that the welding speed is 200 mm/min and the load of the rotary tool 5 onto the welding part 3 is 1400 kg. (c) of FIG. 5 shows the micro structure of a stirring part. (b) and (d) of FIG. 5 show the micro structure of a boundary between the stirring part and a HAZ (heat affected zone). (e) of FIG. 5 shows the micro structure of a Mo base material.

Each of (a) to (d) of FIG. 6 is a diagram showing the metallic structure of the Mo material used in the present experimental example, wherein (a) of FIG. 6 is a diagram showing the macro structure obtained by welding the Mo material under the conditions that the welding speed is 600 mm/min and the load of the rotary tool 5 onto the welding part 3 is 2200 kg. (b) of FIG. 6 shows the micro structure of the stirring part, and (c) of FIG. 6 the micro structure of the boundary between the stirring part and the HAZ (heat affected zone). (d) of FIG. 6 shows the micro structure of the Mo base material.

As shown in (a) to (e) of FIG. 5 and (a) to (d) of FIG. 6, the metallic structure of the welding part 3 is configured by the stirring part, the HAZ, and the base material, and a TMAZ (thermo-mechanically affected zone) could not be confirmed. It is understood from (b) and (d) of FIG. 5 and (c) of FIG. 6 that the boundary clearly exists between the stirring part and the HAZ at any welding speed. Furthermore, it is understood from (c) of FIG. 5 and (b) of FIG. 6 that the presence of the same onion ring as the one in the Al metallic structure was confirmed in the stirring part at any welding speed, and that the stirring part is stirred sufficiently to obtain a refined structure. According to the present experimental example, in a case of the welding speed range from 100 to 600 mm/min, the impact of the welding speed on the metallic structure was hardly confirmed.

FIG. 7 is a graph showing a result of the tensile test performed in Experimental Example 1. FIG. 8 is a graph showing a result of the hardness test performed in Experimental Example 1. As shown in FIG. 7, in a case of the welding speed range from 100 to 600 mm/min, the present experimental example shows a small difference in tensile strength, which is approximately 80% of the strength of the base material. In addition, although the method shown in FIG. 2 was used to carry out an experiment with a welding speed of 400 mm/min and 600 mm/min, no significant difference was observed in the welding strength, and therefore substantially the same welding strength was obtained. Moreover, for hardness distribution in the welding part 3, no clear difference in the welding speed was confirmed in a case of a welding speed range from 200 to 600 mm/min, as shown in FIG. 8. Because the crystal grains become coarse in the HAZ as shown in FIG. 8, a reduction in hardness was confirmed.

For comparison, Mo materials were welded under the same conditions as the ones described above, other than the fact that the welding was performed in the air without using the shield cover 8 and the shield gas. As shown in FIG. 9, is it found that black oxidized parts are generated in the metallic structure of a surface of the welding part 3. FIG. 10 shows a state obtained removing burrs or fragments from the welding part. From FIG. 10 as well, an oxidized black rough surface of the metallic structure was confirmed, and embrittlement of the welding part 3 due to oxidization can be observed.

The invention claimed is:

1. A method for welding a metallic material, the method comprising:
   causing two metallic materials having a melting point of at least 2000° C. to face each other in a welding part;
   inserting a rod-like rotary tool comprising Ir into the welding part; and
   rotating the rotary tool while an inert atmosphere is produced in the welding part on at least a side, into which the rotary tool is inserted, in order to weld the two metallic materials together,
   wherein the rotary tool further comprises either a substance having 0.9 to 35.3 mass % of Re or a substance having 0.9 to 36.3 mass % of Re and 0.05 to 3 mass % of Zr
   wherein the rotary tool further comprises any of Mo, W, Ta, and Hf.

2. The method for welding a metallic material according to claim 1, further comprising welding the metallic materials while covering a side of the welding part opposite to a side into which the rotary tool is inserted with a backing member having a thermal conductivity of 30 W/mK or lower.

3. The method for welding a metallic material according to claim 1, wherein a leading end of the rotary tool has a columnar probe that is inserted into the welding part.

4. The method for welding a metallic material according to claim 1, further comprising welding the metallic materials while rotating the rotary tool at 1000 rpm or lower.

* * * * *